US008386712B2

(12) United States Patent  
Davis et al.

(10) Patent No.: US 8,386,712 B2
(45) Date of Patent: *Feb. 26, 2013

(54) STRUCTURE FOR SUPPORTING SIMULTANEOUS STORAGE OF TRACE AND STANDARD CACHE LINES

(75) Inventors: Gordon T. Davis, Chapel Hill, NC (US); Richard W. Doing, Raleigh, NC (US); John D. Jabusch, Cary, NC (US); M V V Anil Krishna, Cary, NC (US); Brett Olsson, Cary, NC (US); Eric F. Robinson, Raleigh, NC (US); Sumedh W. Sathaye, Austin, TX (US); Jeffrey R. Summers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 539 days.

This patent is subject to a terminal disclaimer.

(21) Appl. No.: 12/116,676

(22) Filed: May 7, 2008

(65) Prior Publication Data

US 2008/0250205 A1 Oct. 9, 2008

Related U.S. Application Data

(63) Continuation-in-part of application No. 11/538,445, filed on Oct. 4, 2006, now Pat. No. 7,644,233.

(51) Int. Cl.
*G06F 12/00* (2006.01)
*G06F 13/00* (2006.01)
*G06F 13/28* (2006.01)

(52) U.S. Cl. .................. 711/118; 711/125; 711/E12.001
(58) Field of Classification Search .................. 711/125, 711/118, E12.001
See application file for complete search history.

(56) References Cited

U.S. PATENT DOCUMENTS

| 5,590,352 A | 12/1996 | Juraski, Jr. et al. |
| 5,634,034 A | 5/1997 | Foster |
| 5,920,890 A | 7/1999 | Moyer et al. |
| 6,014,742 A | 1/2000 | Krick |
| 6,018,786 A | 1/2000 | Krick |
| 6,073,213 A | 6/2000 | Peled |
| 6,076,144 A | 6/2000 | Peled |
| 6,105,032 A | 8/2000 | Bunda |
| 6,145,123 A | 11/2000 | Torrey |
| 6,167,536 A | 12/2000 | Mann |
| 6,170,038 B1 | 1/2001 | Krick |
| 6,185,675 B1 | 2/2001 | Kranich |
| 6,185,732 B1 | 2/2001 | Mann |

(Continued)

FOREIGN PATENT DOCUMENTS

JP 2001057011 2/2001

OTHER PUBLICATIONS

U.S. Appl. No. 11/538,445, filed Oct. 4, 2006, entitled,"Apparatus and Method for Supporting Simultaneous Storage of Trace and Standard Cache Lines,".

(Continued)

*Primary Examiner* — Sheng-Jen Tsai
(74) *Attorney, Agent, or Firm* — Patterson & Sheridan LLP

(57) ABSTRACT

A design structure embodied in a machine readable storage medium for designing, manufacturing, and/or testing a design for a single unified level one instruction cache in which some lines may contain traces and other lines in the same congruence class may contain blocks of instructions consistent with conventional cache lines is provided. A mechanism is described for indexing into the cache, and selecting the desired line. Control is exercised over which lines are contained within the cache. Provision is made for selection between a trace line and a conventional line when both match during a tag compare step.

8 Claims, 4 Drawing Sheets

U.S. PATENT DOCUMENTS

| | | |
|---|---|---|
| 6,216,206 B1 | 4/2001 | Peled et al. |
| 6,223,228 B1 | 4/2001 | Ryan |
| 6,223,338 B1 | 4/2001 | Smolders |
| 6,223,339 B1 | 4/2001 | Shah |
| 6,256,727 B1 | 7/2001 | McDonald |
| 6,279,102 B1 | 8/2001 | Morrison |
| 6,327,699 B1 | 12/2001 | Larus |
| 6,332,189 B1 | 12/2001 | Baweja |
| 6,339,822 B1 | 1/2002 | Miller |
| 6,351,844 B1 | 2/2002 | Bala |
| 6,418,530 B2 | 7/2002 | Hsu |
| 6,442,674 B1 | 8/2002 | Lee |
| 6,449,714 B1 | 9/2002 | Sinharoy |
| 6,453,411 B1 | 9/2002 | Hsu |
| 6,457,119 B1 | 9/2002 | Boggs |
| 6,549,987 B1 | 4/2003 | Rappoport |
| 6,578,138 B1 | 6/2003 | Kyker |
| 6,598,122 B2 | 7/2003 | Mukherjee |
| 6,631,445 B2 | 10/2003 | Rappoport |
| 6,647,491 B2 | 11/2003 | Hsu |
| 6,792,525 B2 | 9/2004 | Mukherjee |
| 6,807,522 B1 | 10/2004 | Orfali |
| 6,823,473 B2 | 11/2004 | Mukherjee |
| 6,854,051 B2 | 2/2005 | Mukherjee |
| 6,854,075 B2 | 2/2005 | Mukherjee |
| 6,877,089 B2 | 4/2005 | Sinharoy |
| 6,950,903 B2 | 9/2005 | Soloman |
| 6,950,924 B2 | 9/2005 | Miller |
| 6,964,043 B2 | 11/2005 | Wu |
| 6,988,183 B1 * | 1/2006 | Wong ............................ 712/208 |
| 7,130,966 B2 | 10/2006 | Solomon et al. |
| 7,260,684 B2 | 8/2007 | Mendelson et al. |
| 7,434,073 B2 | 10/2008 | Magklis et al. |
| 7,437,512 B2 * | 10/2008 | Morrow ........................ 711/125 |
| 7,610,449 B2 | 10/2009 | Davis et al. |
| 7,644,233 B2 | 1/2010 | Davis et al. |
| 7,698,662 B1 * | 4/2010 | Wu et al. ........................... 716/1 |
| 7,934,081 B2 * | 4/2011 | Davis et al. ................... 712/239 |
| 7,996,618 B2 * | 8/2011 | Davis et al. .................... 711/125 |
| 8,037,285 B1 * | 10/2011 | Thaik et al. .................... 712/211 |
| 2001/0042173 A1 | 11/2001 | Bala et al. |
| 2002/0019930 A1 | 2/2002 | Hsu et al. |
| 2002/0042872 A1 | 4/2002 | Kunimatsu et al. |
| 2002/0066081 A1 | 5/2002 | Duesterwald et al. |
| 2002/0078327 A1 | 6/2002 | Jourdan et al. |
| 2002/0087831 A1 | 7/2002 | Samra et al. |
| 2002/0194464 A1 | 12/2002 | Henry et al. |
| 2003/0005230 A1 | 1/2003 | Solomon et al. |
| 2003/0033483 A1 | 2/2003 | O'Connor |
| 2003/0182542 A1 | 9/2003 | Davies et al. |
| 2003/0191924 A1 | 10/2003 | Weaver |
| 2004/0034678 A1 | 2/2004 | Kuszmaul et al. |
| 2005/0149769 A1 | 7/2005 | O'Connor et al. |
| 2005/0193175 A1 * | 9/2005 | Morrow ........................ 711/125 |
| 2005/0251626 A1 | 11/2005 | Glasco |
| 2005/0257035 A1 | 11/2005 | Prasky et al. |
| 2006/0015547 A1 * | 1/2006 | Kuszmaul et al. ............. 708/200 |
| 2006/0090061 A1 | 4/2006 | Akkary et al. |
| 2006/0143382 A1 * | 6/2006 | Damaraju et al. ............. 711/118 |
| 2006/0155932 A1 | 7/2006 | Rasche et al. |
| 2006/0224928 A1 | 10/2006 | Cardinell et al. |
| 2007/0162895 A1 | 7/2007 | Altman et al. |
| 2008/0077778 A1 | 3/2008 | Davis et al. |
| 2008/0114964 A1 | 5/2008 | Davis et al. |
| 2008/0120468 A1 | 5/2008 | Davis et al. |
| 2008/0215804 A1 | 9/2008 | Davis et al. |
| 2008/0229077 A1 | 9/2008 | Sathaye |
| 2008/0235500 A1 | 9/2008 | Davis et al. |
| 2008/0250206 A1 | 10/2008 | Davis et al. |
| 2008/0250207 A1 | 10/2008 | Davis et al. |
| 2009/0013131 A1 * | 1/2009 | Morrow ........................ 711/125 |

OTHER PUBLICATIONS

Moudgill et al., "Register Renaming and Dynamic Speculation: An Alternative Approach," IEEE, 1993.

* cited by examiner

STRUCTURE FOR SUPPORTING SIMULTANEOUS STORAGE OF TRACE AND STANDARD CACHE LINES

CROSS-REFERENCE TO RELATED APPLICATION

This application is a continuation-in-part of U.S. patent application Ser. No. 11/538,445, filed Oct. 4, 2006, now U.S. Pat. No. 7,644,233 which is herein incorporated by reference.

BACKGROUND OF THE INVENTION

Field of the Invention

This invention generally relates to design structures, and more specifically, design structures for a mechanism for indexing into a cache, and selecting a desired line of the cache.

Traditional processor designs make use of various cache structures to store local copies of instructions and data in order to avoid lengthy access times of typical DRAM memory. In a typical cache hierarchy, caches closer to the processor (L1) tend to be smaller and very fast, while caches closer to the DRAM (L2 or L3) tend to be significantly larger but also slower (longer access time). The larger caches tend to handle both instructions and data, while quite often a processor system will include separate data cache and instruction cache at the L1 level (i.e. closest to the processor core). As is understood by those familiar with cache organization and operation, the processor core will issue requests which are handled, if possible, in the closest cache within which responsive data is found (a "cache hit"), with requests being "handed down" from one layer to the next as there may be cache misses.

All of these caches typically have similar organization, with the main difference being in specific dimensions (e.g. cache line size, number of ways per congruence class, number of congruence classes). In the case of an L1 Instruction cache, the cache is accessed either when code execution reaches the end of the previously fetched cache line or when a taken (or at least predicted taken) branch is encountered within the previously fetched cache line. In either case, a next instruction address is presented to the cache. In typical operation, a congruence class is selected via an abbreviated address (ignoring high-order bits), and a specific way within the congruence class is selected by matching the address to the contents of an address field within the tag of each way within the congruence class. Addresses used for indexing and for matching tags can use either effective or real addresses depending on system issues beyond the scope of this disclosure. Typically, low order address bits (e.g. selecting specific byte or word within a cache line) are ignored for both indexing into the tag array and for comparing tag contents. This is because for conventional caches, all such bytes/words will be stored in the same cache line.

Recently, Instruction Caches that store traces of instruction execution have been used, most notably with the Intel Pentium 4. These "Trace Caches" typically combine blocks of instructions from different address regions (i.e. that would have required multiple conventional cache lines). The objective of a trace cache is to handle branching more efficiently, at least when the branching is well predicted. The instruction at a branch target address is simply the next instruction in the trace line, allowing the processor to execute code with high branch density just as efficiently as it executes long blocks of code without branches. Just as parts of several conventional cache lines may make up a single trace line, several trace lines may contain parts of the same conventional cache line. Because of this, the tags must be handled differently in a trace cache. In a conventional cache, low-order address lines are ignored, but for a trace line, the full address must be used in the tag.

A related difference is in handling the index into the cache line. For conventional cache lines, the least significant bits are ignored in selecting a cache line (both index & tag compare), but in the case of a branch into a new cache line, those least significant bits are used to determine an offset from the beginning of the cache line for fetching the first instruction at the branch target. In contrast, the address of the branch target will be the first instruction in a trace line. Thus no offset is needed. Flow-through from the end of the previous cache line via sequential instruction execution simply uses an offset of zero since it will execute the first instruction in the next cache line (independent of whether it is a trace line or not). The full tag compare will select the appropriate line from the congruence class. In the case where the desired branch target address is within a trace line but not the first instruction in the trace line, the trace cache will declare a miss, and potentially construct a new trace line starting at that branch target.

One limitation of trace caches is that branch prediction must be reasonably accurate before constructing traces to be stored in a trace cache. For most code execution, this simply means delaying construction of traces until branch history has been recorded long enough to insure accurate prediction. However, some code paths contain branches that are inherently not predictable. For example, dynamic data may determine whether a specific branch is taken or not. Some implementations add a conventional L1 Instruction cache in addition to an L1 Instruction trace cache in order to better handle code that doesn't execute predictably. This is not a very efficient implementation since the trace cache must be sized to handle all desired trace lines and the conventional cache must be sized to handle all instructions that don't execute predictably. Since the balance between these two resources may be different for different applications, such a design will typically not achieve full utilization of both resources.

SUMMARY OF THE INVENTION

One purpose of this invention is to achieve a flexible balance of resources by handling both predictable and non-predictable code in a single unified instruction cache. Thus, some lines may contain traces and other lines in the same congruence class may contain blocks of instructions consistent with conventional cache lines. One aspect of this invention is the mechanism for indexing into the cache, and selecting the desired line. Another aspect of this invention is control of which lines are contained within the cache. Another aspect is selection between a trace line and a conventional line when both match during the tag compare.

In one embodiment, a design structure embodied in a machine readable storage medium for at least one of designing, manufacturing, and testing a design is provided. The design structure generally includes an apparatus. The apparatus generally includes a computer system central processor, and layered memory operatively coupled to said central processor and accessible thereby, wherein the layered memory has a level one cache, and wherein the level one cache stores in interchangeable locations for both standard cache lines and trace lines.

In another embodiment, a design structure embodied in a machine readable storage medium for at least one of designing, manufacturing, and testing a design is provided. The design structure generally includes an apparatus. The apparatus generally includes a computer system central processor and layered memory coupled to and accessible by the central processor. The layered memory generally includes a level one cache, control logic circuitry associated with said level one cache which controls the selective storing in interchangeable locations of the level one cache of the layered memory for both standard cache lines and trace lines. The control logic circuitry partitions an instruction address presented to the level one cache, indexes the instruction address into a tag array of the level one cache, and compares the instruction address with the tag array a first time to determine whether a match is found. If a match is found on the first comparison, then can be determined whether the match is a trace line. On the other hand, if the match is a trace line, the control logic circuitry checks the trace address, accesses the required partitions, and forwards the instruction for execution by the central processor.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The term "programmed method", as used herein, is defined to mean one or more process steps that are presently performed; or, alternatively, one or more process steps that are enabled to be performed at a future point in time. The term programmed method contemplates three alternative forms. First, a programmed method comprises presently performed process steps. Second, a programmed method comprises a computer-readable medium embodying computer instructions which, when executed by a computer system, perform one or more process steps. Third, a programmed method comprises a computer system that has been programmed by software, hardware, firmware, or any combination thereof to perform one or more process steps. It is to be understood that the term programmed method is not to be construed as simultaneously having more than one alternative form, but rather is to be construed in the truest sense of an alternative form wherein, at any given point in time, only one of the plurality of alternative forms is present.

Figure 1:
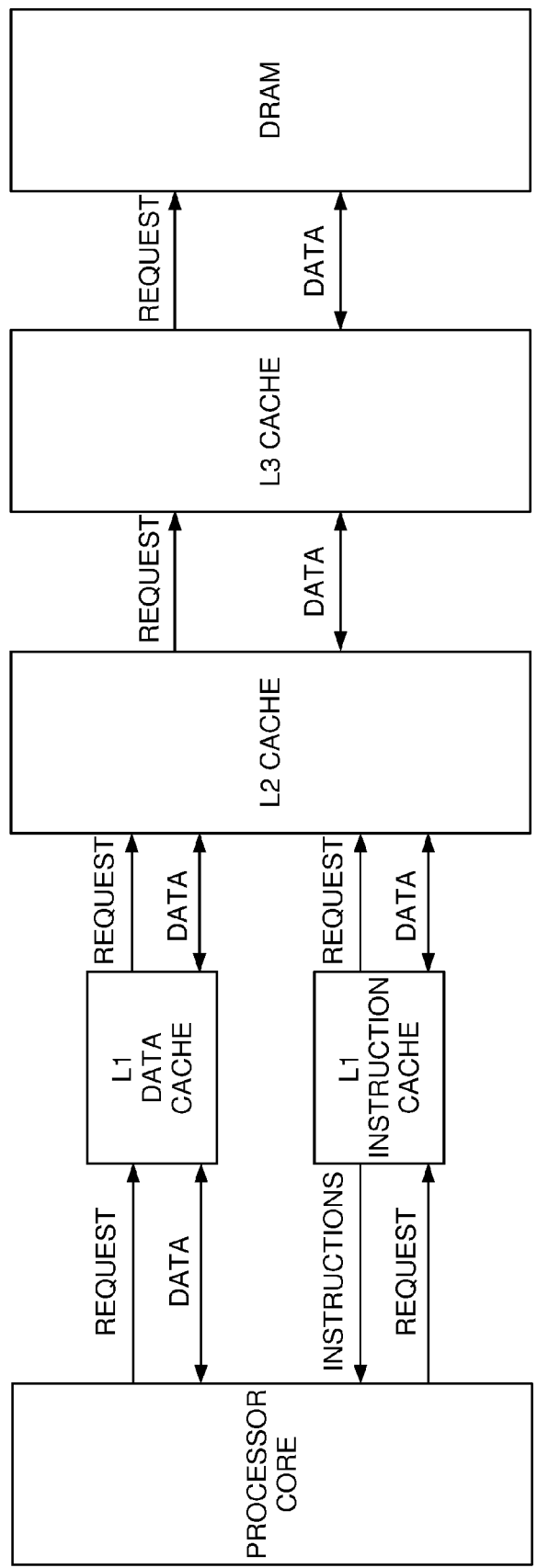
FIG. 1 is a schematic representation of the operative coupling of a computer system central processor and layered memory which has level 1, level 2 and level 3 caches and DRAM.

For a L1 Instruction cache coupled to a computer system processor as shown in FIG. 1 and which has $2^L$ bytes per line, M ways per congruence class, and $2^N$ congruence classes, the instruction address presented to the cache subsystem (FIG. 2) (branch target or flow-through from previous cache line) will be partitioned into the following fields:

a. Least significant L bits (address byte within line)
   b. Next N bits (index into a specific congruence class)
   c. Most significant bits A typical implementation might have L=6 (16 instructions or 64 bytes per line), M=4 ways per congruence class, and N=7 (128 congruence classes), for a total cache size of 32 KBytes. A typical implementation might also partition each cache line into multiple segments. For instance, a 64 byte line might be made up of data from 4 different arrays (16 bytes or 4 instructions per array). The motivation for this partitioning is that in some cases the required data can be accessed without powering up the entire cache line, thus saving power.

Figure 2:
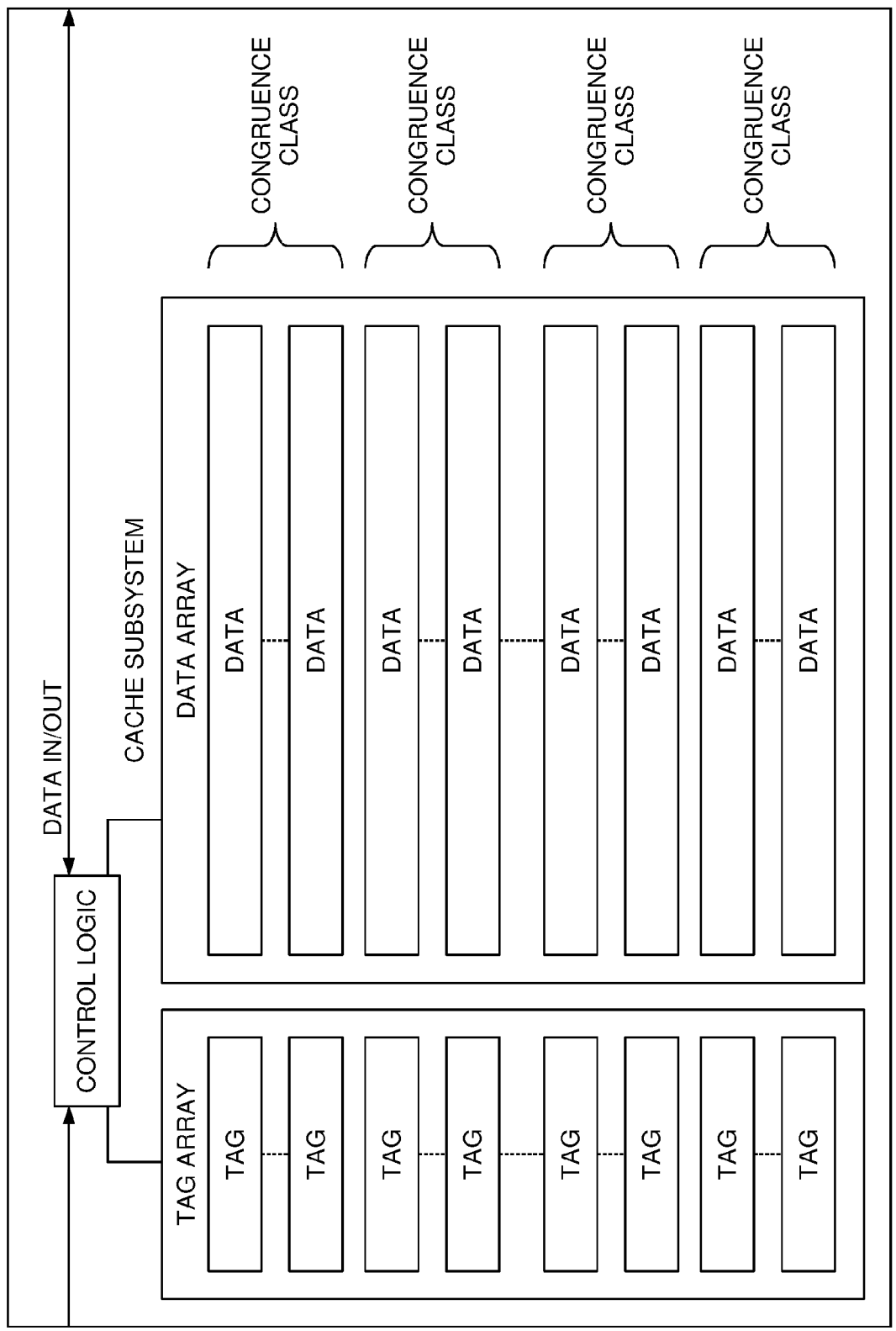
FIG. 2 is a schematic representation of the organization of a L1 cache instruction cache.

It is to be noted that the cache subsystem elements illustrated in FIG. 2 include the tag array, the data array and control logic operatively associated with the two arrays. In accordance with this invention, the control logic circuitry implements the activity of the level one cache as described here. The two arrays are generally similar to prior cache subsystems, and will be understood by persons of skill in the applicable arts. Attention will now be turned to the control logic and the operation of the cache subsystem contemplated by this invention.

Figure 3:
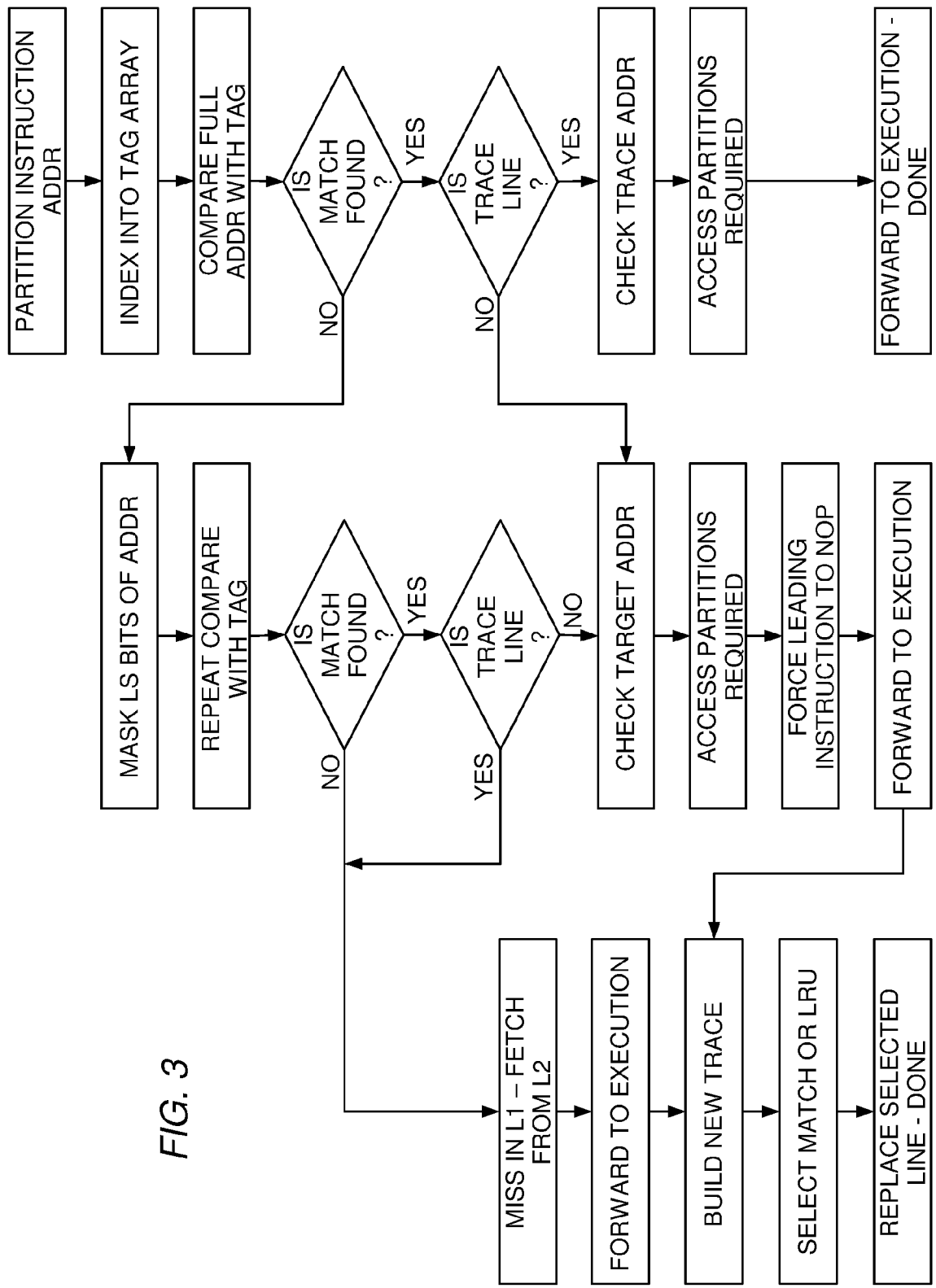
FIG. 3 is a flow chart depicting the processes involved in the operation of a level 1 instruction cache in accordance with this invention.

The process for accessing the cache then includes the following steps as illustrated in the flow chart of FIG. 3:

Take the N bits in the middle partition of the target instruction address for use as an index into the tag array.

For each of the M entries in the tag array from the congruence class selected in step 1, compare the tag field with the full target instruction address.

If match is found, is it a trace line?

If it is a trace line, check the trace length parameter in the tag. Enable only the partitions in the data array required to access the trace contents.

Access cache line from data array and forward trace to execution pipelines and exit process. (Only one cache line is allowed in cache with the same starting address. This may be either a trace line or conventional cache line. In the case of a conventional cache line, it is found during this step only if the target instruction address points to the first instruction of the cache line.)

If no match is found, mask off (to zeros) the L least significant bits of the target instruction address.

Repeat the compare with the tags within the selected congruence class. If a match is found, validate that it is a conventional cache line (i.e. with execution starting somewhere other than the first instruction). Note that if it is a trace line with a starting address with zeros in least-significant bits, it is not the trace line that matches the branch target, and can't be used.

Access cache line from data array. Use least significant L bits from the target instruction address to select only the target partition of the data array. This skips groups of instructions with addresses lower than the branch instruction in increments equal to the data array partition size (e.g. 4 instructions).

Overlay instructions to the left of the branch target instruction (within the same partition as the branch target) with an indication of invalid instruction (force to NOP). Then forward instructions to execution pipelines. If no match is found, declare a miss in the L1 cache, and fetch the target address from the L2 cache.

Then build a new trace line, select a match or least recently used (LRU), and replace the selected line.

In order to insure proper operation, certain rules must be enforced when adding a line (either conventional or trace) to the cache:

If the address of the first instruction in the line to be added matches the tag of a line already in the cache, that matching line must be removed in order to add the new line. This insures that a tag will be unique. If there is no match in tags, then the least recently used line (as indicated by LRU or pseudo-LRU) is replaced by the new line.

Figure 4:
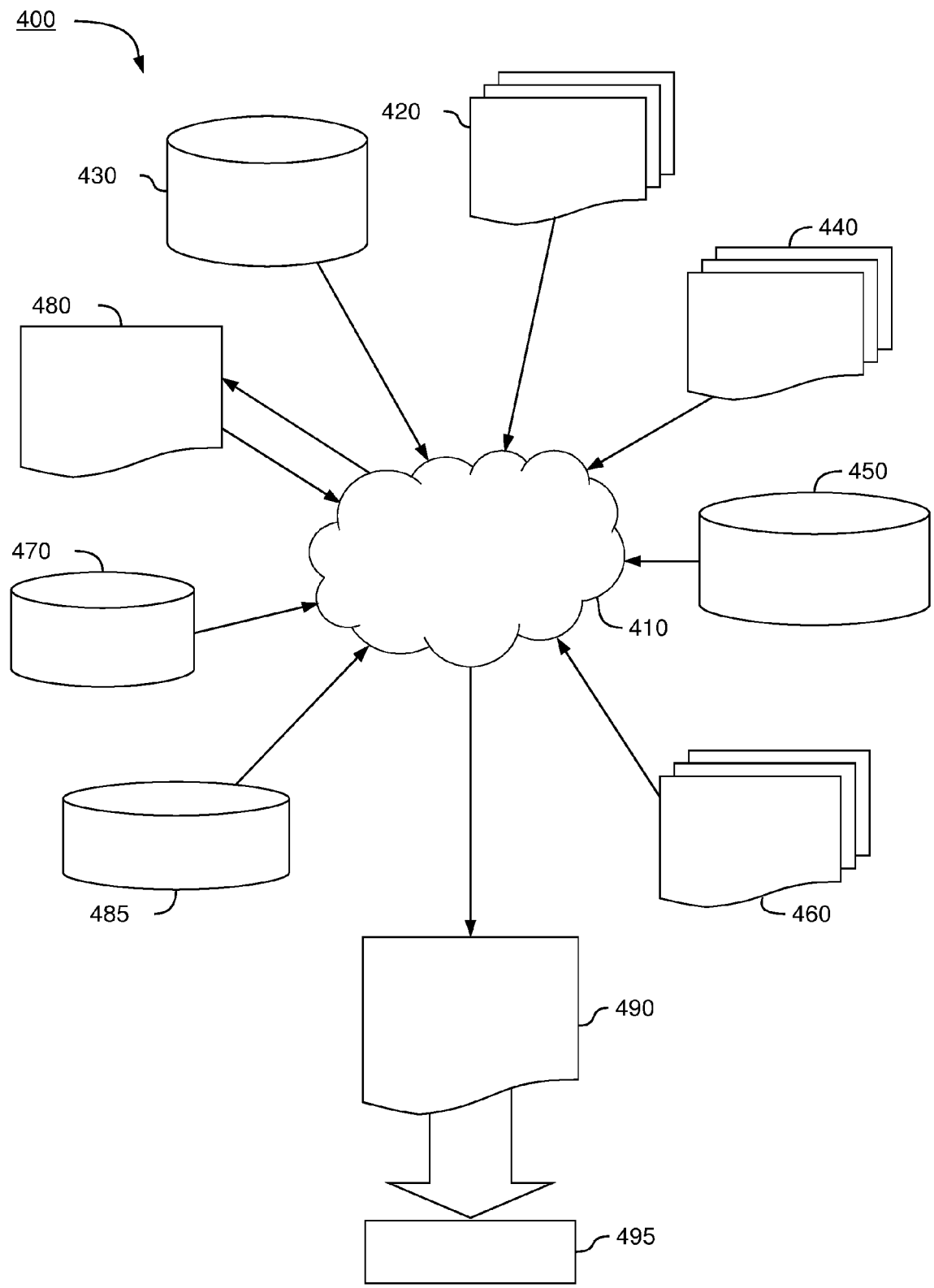
FIG. 4 is a flow diagram of a design process used in semiconductor design, manufacture, and/or test.

FIG. 4 shows a block diagram of an exemplary design flow 400 used for example, in semiconductor design, manufacturing, and/or test. Design flow 400 may vary depending on the type of IC being designed. For example, a design flow 400 for building an application specific IC (ASIC) may differ from a design flow 400 for designing a standard component. Design structure 420 is preferably an input to a design process 410 and may come from an IP provider, a core developer, or other design company or may be generated by the operator of the design flow, or from other sources. Design structure 420 comprises the circuits described above and shown in FIGS. 1 and 2 in the form of schematics or HDL, a hardware-description language (e.g., Verilog, VHDL, C, etc.). Design structure 420 may be contained on one or more machine readable medium. For example, design structure 420 may be a text file or a graphical representation of a circuit as described above and shown in FIGS. 1 and 2. Design process 410 preferably synthesizes (or translates) the circuits described above and shown in FIGS. 1 and 2 into a netlist 480, where netlist 480 is, for example, a list of wires, transistors, logic gates, control circuits, I/O, models, etc. that describes the connections to other elements and circuits in an integrated circuit design and recorded on at least one of machine readable medium. For example, the medium may be a storage medium such as a CD, a compact flash, other flash memory, or a hard-disk drive. The medium may also be a packet of data to be sent via the Internet, or other networking suitable means. The synthesis may be an iterative process in which netlist 480 is resynthesized one or more times depending on design specifications and parameters for the circuit.

Design process 410 may include using a variety of inputs; for example, inputs from library elements 430 which may house a set of commonly used elements, circuits, and devices, including models, layouts, and symbolic representations, for a given manufacturing technology (e.g., different technology nodes, 32 nm, 45 nm, 90 nm, etc.), design specifications 440, characterization data 450, verification data 460, design rules 470, and test data files 485 (which may include test patterns and other testing information). Design process 410 may further include, for example, standard circuit design processes such as timing analysis, verification, design rule checking, place and route operations, etc. One of ordinary skill in the art of integrated circuit design can appreciate the extent of possible electronic design automation tools and applications used in design process 410 without deviating from the scope and spirit of the invention. The design structure of the invention is not limited to any specific design flow.

Design process 410 preferably translates a circuit as described above and shown in FIGS. 1 and 2, along with any additional integrated circuit design or data (if applicable), into a second design structure 490. Design structure 490 resides on a storage medium in a data format used for the exchange of layout data of integrated circuits (e.g. information stored in a GDSII (GDS2), GL1, OASIS, or any other suitable format for storing such design structures). Design structure 490 may comprise information such as, for example, test data files, design content files, manufacturing data, layout parameters, wires, levels of metal, vias, shapes, data for routing through the manufacturing line, and any other data required by a semiconductor manufacturer to produce a circuit as described above and shown in FIGS. 1 and 2. Design structure 490 may then proceed to a stage 495 where, for example, design structure 490: proceeds to tape-out, is released to manufacturing, is released to a mask house, is sent to another design house, is sent back to the customer, etc.

In the drawings and specifications there has been set forth a preferred embodiment of the invention and, although specific terms are used, the description thus given uses terminology in a generic and descriptive sense only and not for purposes of limitation.

What is claimed is:

1. A design structure embodied in a machine readable storage medium for at least one of designing, manufacturing, and testing a design, the design structure comprising:
   an apparatus comprising:
      a computer system central processor and layered memory coupled to and accessible by the central processor, the layered memory including a level one cache;
      control logic circuitry associated with said level one cache which controls the selective storing in interchangeable locations of the level one cache of the layered memory both standard cache lines and trace lines;
      said control logic circuitry partitioning an instruction address presented to the level one cache; indexing the instruction address into a tag array of the level one cache; and comparing the instruction address with the tag array a first time to determine whether a match is found; and
      if the match is found on the first comparison, then determining whether the match is a trace line;
      upon determining that the match is the trace line:
         checking a trace length parameter in a tag associated with the trace line to determine the number of partitions required to access the trace,
         accessing only the required partitions, and
         forwarding at least one instruction associated with the required partitions for execution by the central processor;
      if no match is found during the first comparison:
         comparing the instruction address with a portion of the tag array within a selected congruence class to determine whether a different match is found,
         if the different match is found, determining whether the different match is associated with a second trace line, and
         if so, the second trace line is not transmitted to the central processor for execution.

2. The design structure of claim 1, wherein the design structure comprises a netlist, which describes the apparatus.

3. The design structure of claim 1, wherein the design structure resides on the machine readable storage medium as a data format used for the exchange of layout data of integrated circuits.

4. A design structure embodied in a machine readable storage medium for at least one of designing, manufacturing, and testing a design, the design structure comprising:
   an apparatus comprising:
      a computer system central processor and layered memory coupled to and accessible by the central processor, the layered memory including a level one cache;

control logic circuitry associated with said level one cache which controls the selective storing in interchangeable locations of the level one cache of the layered memory both standard cache lines and trace lines;

said control logic circuitry partitioning an instruction address presented to the level one cache; indexing the instruction address into a tag array of the level one cache; and comparing the instruction address a first time with entries of the tag array corresponding to a selected congruence class to determine whether a match is found; and if the match is found on the first comparison, then determining whether the match is a trace line;

upon determining that the match is the trace line:
   checking a trace length parameter in a tag associated with the trace line to determine the number of partitions required to access the trace,
   accessing the required partitions, and
   forwarding at least one instruction associated with the required partitions for execution by the central processor; and if no match is found during the first comparison:
   comparing the instruction address a second time with the entries of the tag array corresponding to the selected congruence class to determine whether a different match is found,
   if a match is found on the second comparison, determining whether the different match is a standard cache line, and
   upon determining the different match is a standard cache line, forwarding at least a portion of the standard cache line for execution by the central processor.

5. The design structure of claim 4, wherein performing the comparison the second time further comprises:
   masking one or more least significant bits of the instruction address; and
   comparing the masked instruction address with the tag array to determine whether a match is found.

6. The design structure of claim 4, wherein, before performing the first comparison, selecting the congruence class using a portion of the instruction address, wherein the first and second comparisons compare tag fields associated with the selected congruence class with at least a portion of the instruction address.

7. The design structure of claim 6, wherein determining that the match is a trace line during the first comparison further comprises comparing the tag fields with each of the bits of the instruction address to determine if one of the tag fields matches all of the bits of the instruction address.

8. The design structure of claim 4, wherein determining that the match is the trace line during the first comparison further comprises comparing the entries of the tag array with each of the bits of the instruction address to determine if one of the entries matches all of the bits of the instruction address; and
   wherein performing the comparison the second time further comprises:
      masking one or more least significant bits of the instruction address, and
      comparing the masked instruction address with the tag array to determine whether a match is found.

* * * * *